(12) United States Patent
Momose et al.

(10) Patent No.: US 6,362,733 B1
(45) Date of Patent: Mar. 26, 2002

(54) TIRE INFLATION PRESSURE MONITOR AND MONITORING METHOD

(75) Inventors: Akira Momose; Mitiya Katou, both of Ogaki (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 0 days.

(21) Appl. No.: 09/479,317

(22) Filed: Jan. 6, 2000

(30) Foreign Application Priority Data

Aug. 17, 1999 (JP) .......................................... 11-230721

(51) Int. Cl.$^7$ ............................................... B60C 23/00
(52) U.S. Cl. ................... 340/447; 340/442; 340/527.7; 340/825.49; 73/146.2; 455/67.1
(58) Field of Search ................................. 340/447, 445, 340/442, 572.7, 539, 825.36, 825.49; 73/146.2; 455/67.1, 82, 83

(56) References Cited

U.S. PATENT DOCUMENTS

| | | | | |
|---|---|---|---|---|
| 3,810,090 A | * | 5/1974 | Davis, Jr. et al. | 340/442 |
| 5,559,484 A | * | 9/1996 | Nowicki et al. | 340/447 |
| 5,889,464 A | * | 3/1999 | Huang | 340/442 |
| 5,939,977 A | * | 8/1999 | Monson | 340/442 |
| 6,018,647 A | * | 1/2000 | Fitzgerald | 455/135 |

* cited by examiner

Primary Examiner—Edward Lefkowitz
Assistant Examiner—Davetta W. Goins
(74) Attorney, Agent, or Firm—Beyer Weaver & Thomas, LLP

(57) ABSTRACT

A tire inflation pressure monitor includes a number of transmitters and a receiver. The transmitters transmit data concerning tire inflation pressure by radio waves, and the receiver receives the data from the transmitters. The receiver includes reception antennas and a synthesizer. The reception antennas respectively induce voltage signals based on the reception of the radio waves from the transmitters, and the synthesizer synthesizes the induced voltage signals into one voltage signal. The synthesizer selects the highest level voltage signal from the induced voltage signals and outputs the voltage signal to a reception circuit. Therefore, the synthesizer permits the reception circuit to receive the voltage signal of a given transmitter without fail.

6 Claims, 5 Drawing Sheets

TIRE INFLATION PRESSURE MONITOR AND MONITORING METHOD

BACKGROUND OF THE INVENTION

The present invention relates to a tire inflation pressure monitor that informs a driver in a vehicle of the tire inflation pressure and the monitoring method.

A wireless tire inflation pressure monitor that notifies a driver of a vehicle of the tire inflation pressures is known. As shown in FIG. 8, a typical tire inflation pressure monitor 51 includes four transmitters 53 and a receiver 54. The transmitters 53 are respectively located in tires 52 and the receiver 54 is located in the body of the vehicle 50.

Each transmitter 53 measures the internal air pressure of the corresponding tire 52. Each transmitter also modulates signals to reflect data concerning the measured tire inflation pressure and transmits the signals from transmission antennas (not shown) by radio waves.

As shown in FIG. 7 and 8, the receiver 54 includes four reception antennas 56, which respectively correspond to the four transmitters 53. The receiver 54 also includes a reception circuit 57 and a controller 58. A display 55 is located in the passenger's compartment and is connected to the receiver 54.

The reception circuit 57 receives radio waves from the transmitters 53 through the reception antennas 56. The reception circuit 57 demodulates the radio waves, which reveals the pressure data, and sends the data to the controller 58. The controller 58 commands a display 55 to display information concerning tire inflation pressure based on the input data.

The reception antennas 56 induce voltage in accordance with the electric field intensity of the radio waves from the transmitters 53. When the voltage induced by the reception antennas 56 is greater than a predetermined value, the reception circuit 57 detects the induced voltage and processes the voltage signal to produce the necessary data. When the voltage induced by the reception antennas 56 is smaller than the predetermined value, the reception circuit 57 does not detect the induced voltage. In this way, if the voltage induced by the reception antennas 56 is not high enough to be detected by the reception circuit 57, the receiver 54 cannot receive data from the transmitters 53.

Since the transmitters 53 are installed in the tires 2, the position of each transmitter relative to the reception antenna 56 of the receiver 54 continuously varies when the vehicle 50 is running. The transmission antennas of the transmitters 53 and the reception antenna 56 of the receiver 54 each have directivity. Therefore, the electric field intensity of radio waves from the transmission antennas received at each reception antenna 56 continuously varies when the vehicle 5 is running. In other words, the voltage induced at each reception antenna 56 continuously varies and the reception circuit 57 may not detect the induced voltage. Therefore, the signal reception of the prior art receiver 54 is not stable.

SUMMARY OF THE INVENTION

An objective of the present invention is to provide a tire inflation pressure monitor and a monitoring method that produce stable signal reception.

To achieve the above objective, the present invention provides a receiver for receiving radio waves that carry data representing a physical state. The radio waves are transmitted by a transmitter. The receiver includes a plurality of reception antennas that respectively induce voltage signals based on reception of the radio waves, a synthesizer for synthesizing the induced voltage signals into one voltage signal, and a processing device for processing the synthesized voltage signal to obtain the data.

The present invention also provides a tire inflation pressure monitor having a transmitter located in a vehicle tire for transmitting data concerning the inflation pressure of the tire by radio waves and a receiver for receiving the data from the transmitter. The receiver includes a plurality of reception antennas that respectively induce voltage signals based on reception of the radio waves, a synthesizer for synthesizing the induced voltage signals into a synthesized voltage signal, and a processing device for processing the synthesized voltage signal to obtain the data.

The present invention further provides a method including: transmitting data representing a physical state by radio waves; receiving the radio waves and inducing voltage signals with reception antennas, respectively; synthesizing the induced voltage signals into one voltage signal; and processing the synthesized voltage signal to obtain the data.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A tire inflation pressure monitor according to one embodiment of the present invention will now be described with reference to FIGS. 1–6(c).

Figure 1:
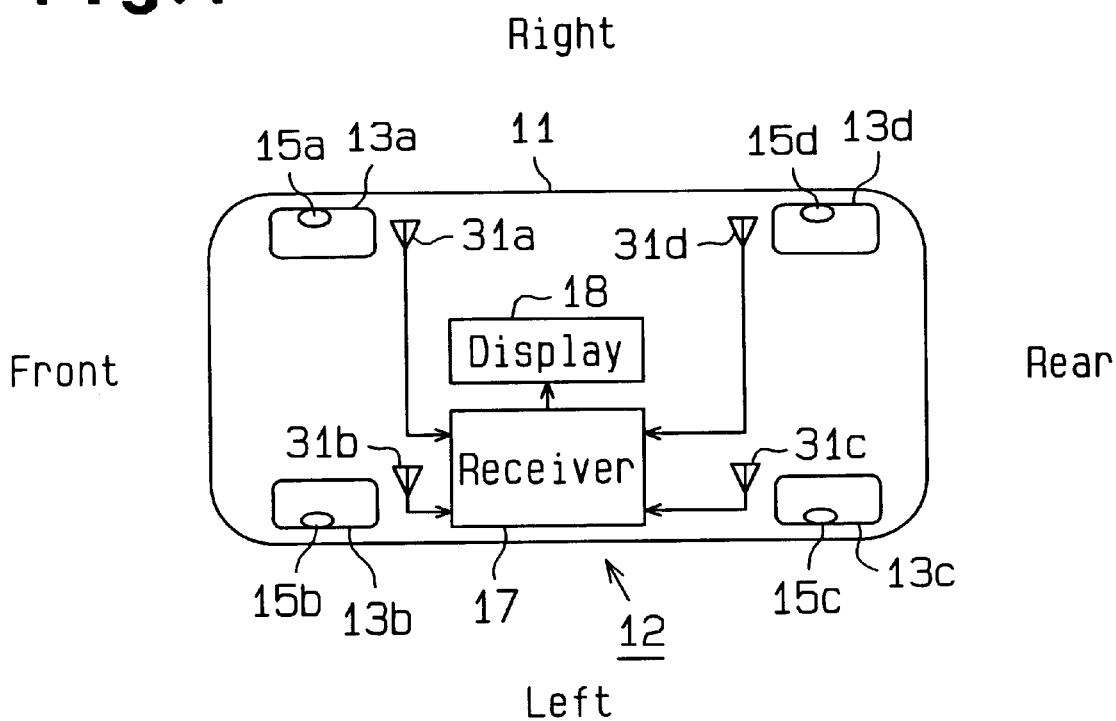
FIG. 1 is a schematic block diagram of a tire inflation pressure monitor according to one embodiment of the present invention.
Figure 2:
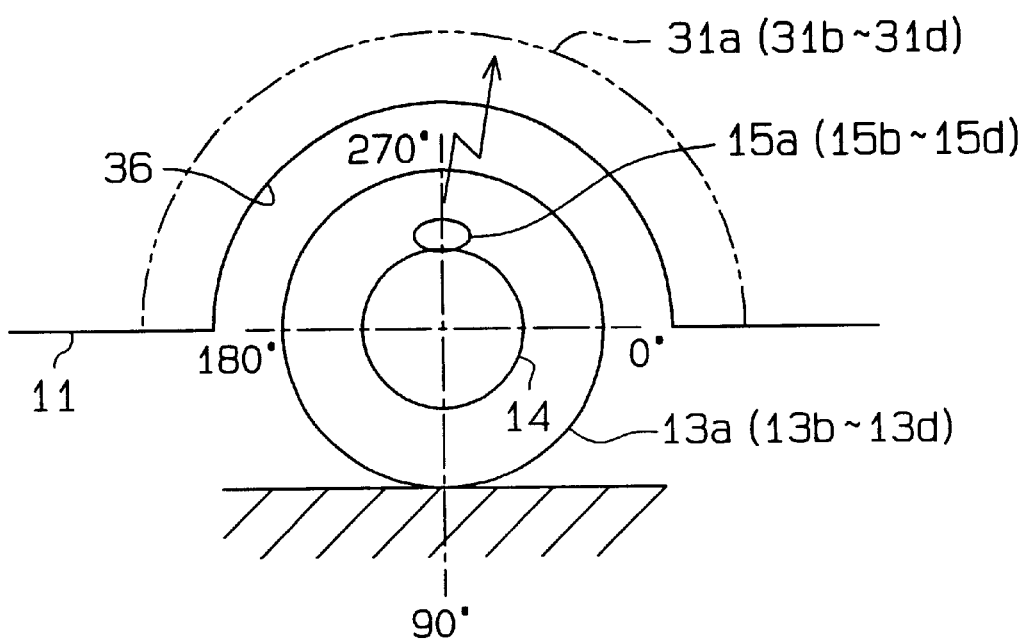
FIG. 2 is a partial schematic side view of a vehicle showing a transmitter attached to a tire and a reception antenna attached to a fender.

As shown in FIG. 1, a tire inflation pressure monitor 12 includes four transmitters 15a–15d, one receiver 17, and a display 18. The transmitters 15a–15d are respectively located in four tires 13a–13d of a vehicle 11. The receiver 17 is located in a body of the vehicle 11. The display 18 is located in the passenger compartment. As shown in FIG. 2, each transmitter 15a–15d is fixed to a wheel 14 inside the corresponding tire 13a–13d. In FIG. 1, 13a is a right front tire, 13b is a left front tire, 13c is a left rear tire, and 13d is a right rear tire.

Figure 3:
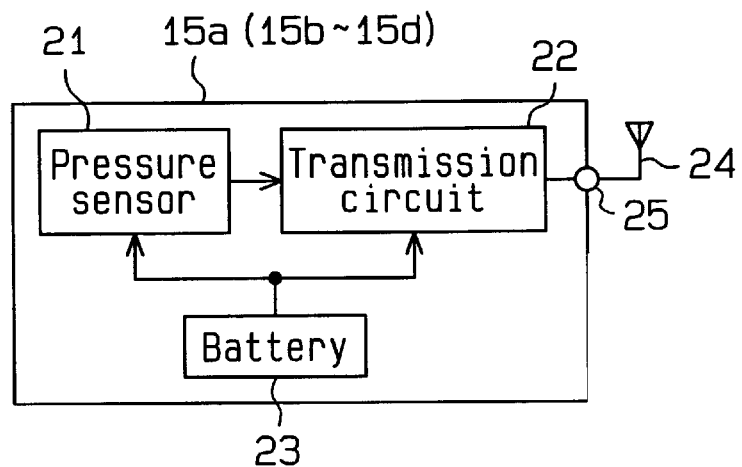
FIG. 3 is a block circuit diagram showing a transmitter of the monitor of FIG. 1.

As shown in FIG. 3, each transmitter 15a–15d includes a pressure sensor 21, a transmission circuit 22, a power source 23, and a transmission antenna 24. The power source 23 is, for example, a lithium battery and supplies the pressure sensor 21 and the transmission circuit 22 with electricity. The transmission antenna 24 emits radio waves mainly in the radial direction of the corresponding tire 13a–13d. The pressure sensor 21 is connected to the transmission circuit 22, which is connected to the transmission antenna 24 through an output terminal 25.

The pressure sensor 21 detects the internal air pressure of the corresponding tire 13a–13d and sends a signal carrying information about the detected pressure to the transmission circuit 22. The signal sent to the transmission circuit may reflect the detected pressure or it may, or it may simply indicate whether the pressure is normal or not.

The transmission circuit 22 includes an internal memory (not shown), which stores a unique ID code. The ID code is used to distinguish the transmitters 15a–15d located in the vehicle 11 from one another. The transmission circuit 22 performs modulation to produce a signal that carries data representing the pressure information and the ID code and transmits the resulting modulated signal from the transmission antenna 24 by radio waves.

The transmission circuit 22 performs transmission at predetermined intervals. Each transmitter 15a–15d has a different transmission timing so that each transmitter 15a–15d performs transmission at a different time. Therefore, it is unlikely that two or more of the transmitters 15a–15d will simultaneously transmit radio waves. In other words, the receiver 17 receives a signal from each transmitter 15a–15d at a different time.

Figure 4:
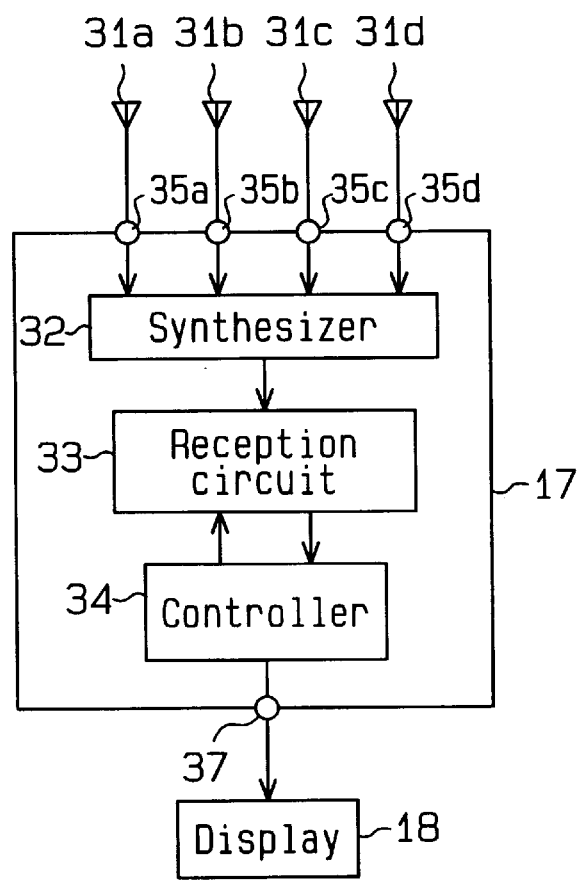
FIG. 4 is a block circuit diagram showing a receiver of the monitor of FIG. 1.

As shown in FIG. 1, the receiver 17 includes first to fourth reception antennas 31a–31d, which respectively correspond to the four tires 13a–13d. As shown in FIG. 4 the receiver 17 also includes a synthesizer 32, a reception circuit 33, and a controller 34. The reception antennas 31a–31d are respectively connected to the synthesizer 32 through input terminals 35a–35d of the receiver 17. The synthesizer 32 is connected to the reception circuit 33, which is connected to the controller 34. The controller 34 is connected to the display 18 through an output terminal 37.

As shown in FIG. 2, each reception antenna 31a–31d is an arcuate wire antenna, which extends along a corresponding fender 36. Each reception antenna 31a–31d induces voltage in accordance with the electric field intensity of radio waves from the corresponding transmitter 15a–15d and outputs the induced voltage to the synthesizer 32.

Figure 5:
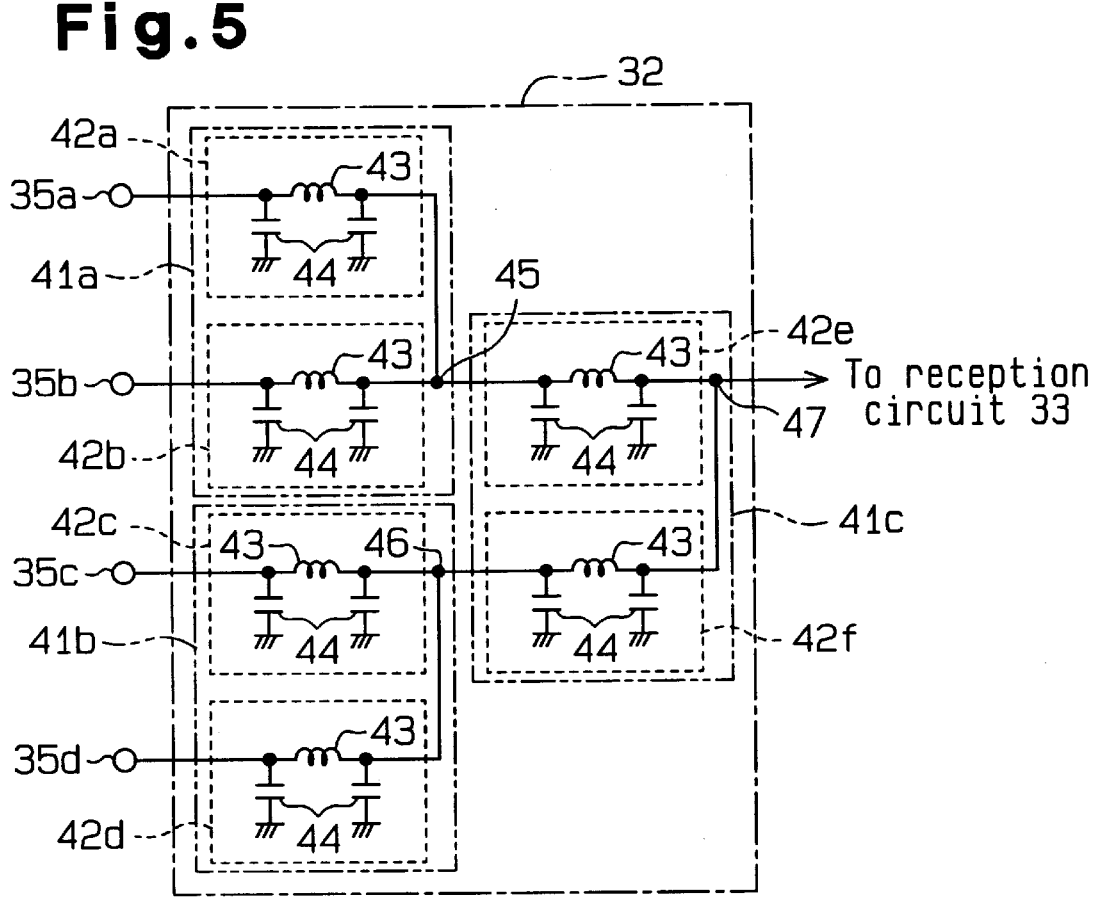
FIG. 5 is a block circuit diagram of a synthesizer of the receiver of FIG. 4.

As shown in FIG. 5, the synthesizer 32 is an electric circuit that receives four signals and outputs one signal. The synthesizer 32 includes first to third selection circuits 41a–41c. The selection circuits 41a–41c respectively receive two signals and output one signal.

The first selection circuit 41a receives voltage signals from the first and second reception antennas 31a, 31b through the input terminals 35a, 35b. The second selection circuit 41b receives voltage signals from the third and fourth reception antennas 31c, 31d through the input terminals 35c, 35d. The third selection circuit 41c receives voltage signals from the first and second selection circuits 41a, 41b. The third selection circuit 41c outputs a voltage signal to the reception circuit 33.

The first selection circuit 41a includes first and second π-type filter circuits 42a, 42b. The second selection circuit 41b includes first and second π-type filter circuits 42c, 42d. The third selection circuit 41c includes first and second π-type filter circuits 42e, 42f. Each π-type filter circuit 42a–42f includes a coil 43 and two capacitors 44, which are connected to the ends of the associated coil 43. One end of each capacitor 44 is connected to an end of the associated coil 43 and the other end is grounded. One end of each coil 43 is an input end of the associated π-type filter circuit 42a–42f and the other end is an output end of each π-type filter circuit 42a–42f.

In the first selection circuit 41a, the input end of the first π-type filter circuit 42a is connected to the first reception antenna 31a through an input terminal 35a, and the input end of the second π-type filter circuit 42b is connected to the second reception antenna 31b through an input terminal 35b. In the second selection circuit 41b, the first π-type filter circuit 42c is connected to the third reception antenna 31c through an input terminal 35c, and the second π-type filter circuit 42d is connected to the fourth reception antenna 31d through an input terminal 35d.

The output ends of the π-type filter circuits 42a, 42b of the first selection circuit 41a are connected at a first node 45. The input end of the first π-type filter circuit 42e of the third selection circuit 41c is connected to the first node 45. The output ends of the π-type filter circuits 42c, 42d of the second selection circuit 41b are connected at a second node 46. The input end of the second π-type filter circuit 42f of the third selection circuit 41c is connected to the second node 46. The output ends of the π-type filter circuits 42e, 42f of the third selection circuit 41c are connected at a third node 47. The reception circuit 33 is connected to the third node 47.

The input and output impedances of each selection circuit 41a–41c are adjusted such that each selection circuit 41a–41c selectively outputs the higher of the two voltage signals that are simultaneously input.

The first selection circuit 41a synthesizes two voltage signals into one voltage signal and outputs the signal to the first π-type filter circuit 42e of the third selection circuit 41c. The two voltage signals synthesized by the first selection circuit 41a are the voltage signal that is input to the first π-type filter circuit 42a from the first reception antenna 31a and the voltage signal that is input to the second π-type filter circuit 42b from the second reception antenna 31b. The second selection circuit 41b synthesizes two voltage signals into one voltage signal and outputs the signal to the second π-type filter circuit 42f of the third selection circuit 41c. The two voltage signals synthesized by the second selection circuit 41b are the voltage signal that is input to the first π-type filter circuit 42c from the third reception antenna 31c and the voltage signal that is input to the second π-type filter circuit 42d from the fourth reception antenna 31d. The third selection circuit 41c synthesizes two voltage signals into one voltage signal and outputs the signal to the reception circuit 33. The two voltage signals synthesized by the third selection circuit 41c are the voltage signal that is input to the first π-type filter circuit 42e and the voltage signal that is input to the second π-type filter circuit 42f.

In this way, the synthesizer 32 synthesizes the voltage signals respectively input from the four reception antennas 31a–31d into one voltage signal and outputs the signal. In other words, the synthesizer 32 selectively outputs only the highest voltage signal of the voltage signals that are simultaneously input from the four reception antennas 31a–31d.

The reception circuit 33 shown in FIG. 4 includes various circuits including an amplifier circuit and a demodulation circuit, though they are not shown. The reception circuit 33 amplifies and demodulates the voltage signal input from the synthesizer 32 and outputs the signal to the controller 34. The reception circuit 33 and the controller 34 function as a processing device that processes the synthesized voltage signals from the synthesizer 32.

When the level of a voltage signal from the synthesizer 32 is greater than a predetermined level, the reception circuit 33 detects and processes the voltage signal. When the level of a voltage signal from the synthesizer 32 is smaller than a predetermined level, the reception circuit 33 does not detect and process the voltage signal. In this way, if the level of a voltage signal from the synthesizer 32 is not high enough to be detected by the reception circuit 33, the reception circuit 33 is not able to process the voltage signal from the synthesizer 32. As a result, the receiver 17 cannot receive data from the transmitters 15a–15d.

The controller 34 shown in FIG. 4 includes a CPU (central processing unit) and a memory. The CPU controls the entire operation of the receiver 17. Various information including a control program are stored in the memory in advance. The ID codes of the transmitters 15a–15d of the tires 13a–13d are initially registered in the memory.

The controller 34 determines necessary data including the pressure data and the ID codes from the signal from the reception circuit 33. The controller 34 judges whether the tire inflation pressures of the tires 13a–13d corresponding to the transmitters 15a–15d are normal or not, based on the determined data.

The controller 34 commands the display 18 to display information concerning tire inflation pressure and other necessary information. When there is an abnormality in the tire inflation pressures, the display 18 warns of the abnormality. The display 18 may display information with letters or include light emitting diodes that respectively correspond to the tires 13a–13d. If the display 18 includes light emitting diodes, it warns of the abnormality of tire inflation pressure by turning on, turning off, or blinking the light emitting diodes.

The operation of the illustrated tire inflation pressure monitor will now be described. Monitoring of the tire inflation pressure of the right front tire 13a will be representatively described.

When the vehicle 11 is running, or when the tire 13a is rotating, the transmitter 15a in the tire 13a transmits radio waves at regular intervals. The first to fourth reception antennas 31a–31d respectively receive radio waves from the transmitter 15a. Each reception antenna 31a–31d induces voltage in accordance with the electric field intensity of the received radio waves.

As shown in FIG. 1, the distance from the transmitter 15a of the tire 13a increases in the order of the first reception antenna 31a, the second reception antenna 31b, the fourth reception antenna 31d, and the third reception antenna 31c. Generally, the electric field intensity of radio waves is reduced as the distance from a transmitter increases. Therefore, if the distance from the transmitter 15a is the only factor that is taken into consideration, the voltage induced by each reception antenna 31a–31d based on the radio waves from the transmitter 15a decreases basically in the order of the first reception antenna 31a, the second reception antenna 31b, the fourth reception antenna 31d, and the third reception antenna 31c.

As the tire 13a rotates, the direction of radio wave emission from the transmission antenna 24 of the transmitter 15a continuously varies. The transmission antenna 24 and the reception antennas 31a–31d each have directivity. Therefore, the electric field intensity of radio waves from the transmitter 15a received at each reception antenna 31a–31d continuously varies. In other words, the voltage induced at each reception antenna 31a–31d continuously varies.

Figure 6A:
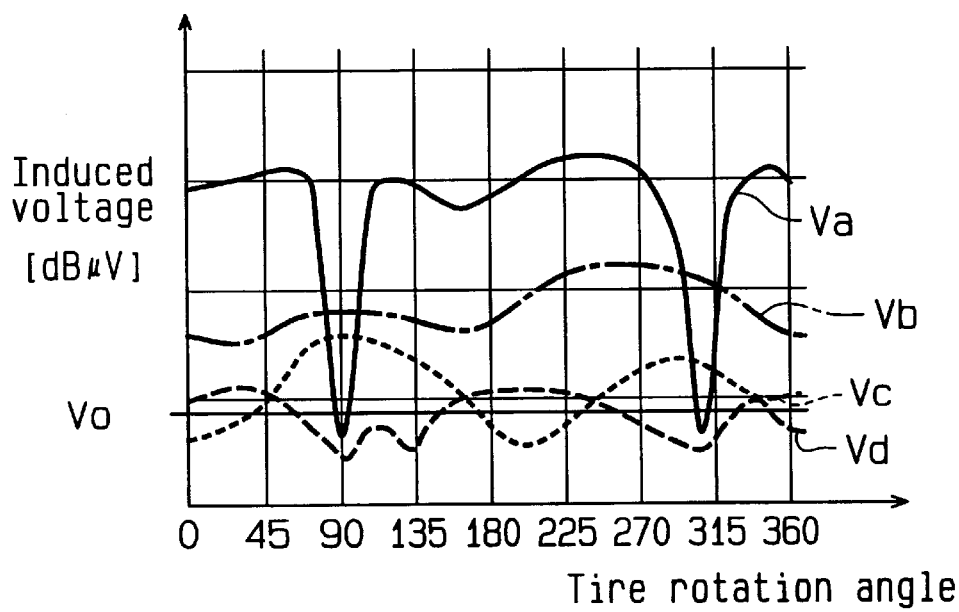
FIG. 6(a) is a graph exemplifying the fluctuation of voltage induced by each reception antenna.

FIG. 6(a) is a graph exemplifying the fluctuations of the voltages Va–Vd induced at the reception antennas 31a–31d relative to the rotation angle of the tire 13a. The induced voltages Va–Vd are generated based on the radio waves from the transmitter 15a of the tire 13a. The horizontal axis represents the rotation angle of the tire 13a. The rotation angle corresponds to the angular position of the transmitter 15a shown in FIG. 2. The vertical axis of FIG. 6(a) represents the threshold Vo, which represents a minimum level of voltage from the synthesizer 32 that can be detected by the reception circuit 33. The reception circuit 33 is not able to detect voltage signals lower than the threshold Vo.

As shown in FIG. 6(a), the voltage Va that is induced at the first reception antenna 31a, which is located closest to the transmitter 15a, may become smaller not only with respect to the voltages Vb, Vc that are induced at the other antennas 31b, 31c but also with resect to the threshold Vo, depending on the rotation angle of the tire 13a, or the angular position of the transmitter 15a.

The first and second reception antennas 31a, 31b respectively apply induced voltages Va, Vb to the first selection circuit 41a of the synthesizer 32. The third and fourth reception antenna 31c, 31d respectively apply induced voltages Vc, Vd to the second selection circuit 41b of the synthesizer 32.

Figure 6B:
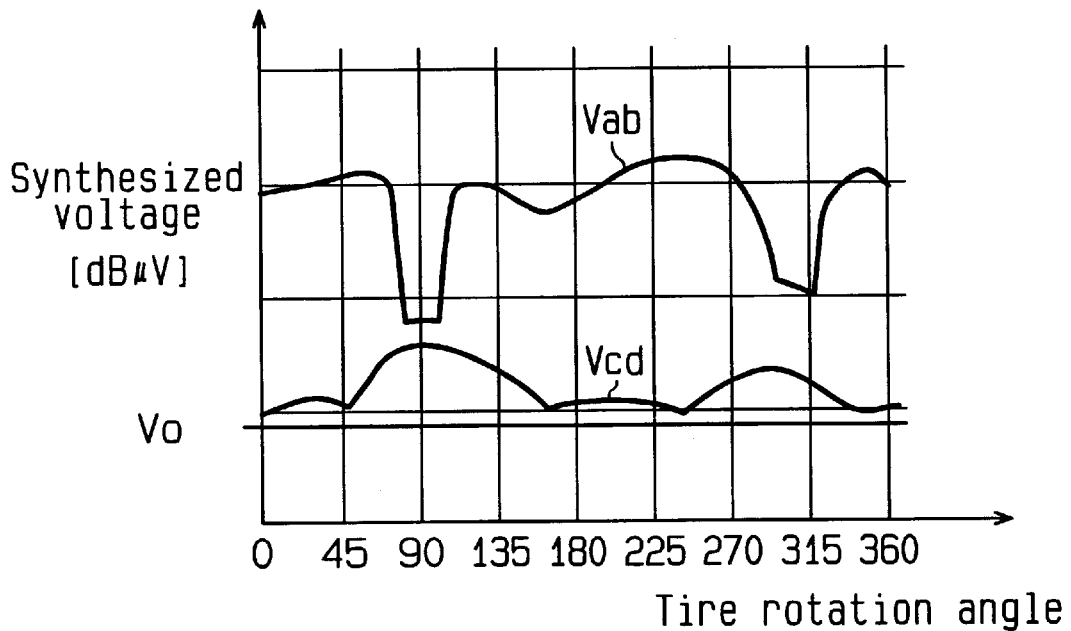
FIG. 6(b) is a graph exemplifying the synthesized voltage signals that are respectively output from the first and second selection circuits of the synthesizer of FIG. 5.

The first selection circuit 41a selects the higher voltage of the induced voltages Va, Vb that are simultaneously received and applies the selected voltage to the third selection circuit 41c as a synthesized voltage signal Vab. The second selection circuit 41b selects the higher of the induced voltages Vc, Vd t hat are simultaneously applied and applies the selected voltage to the third selection circuit 41c as a synthesized voltage signal Vcd. FIG. 6(b) is a graph exemplifying the synthesized voltage signals Vab, Vcd corresponding to FIG. 6(a).

Figure 6C:
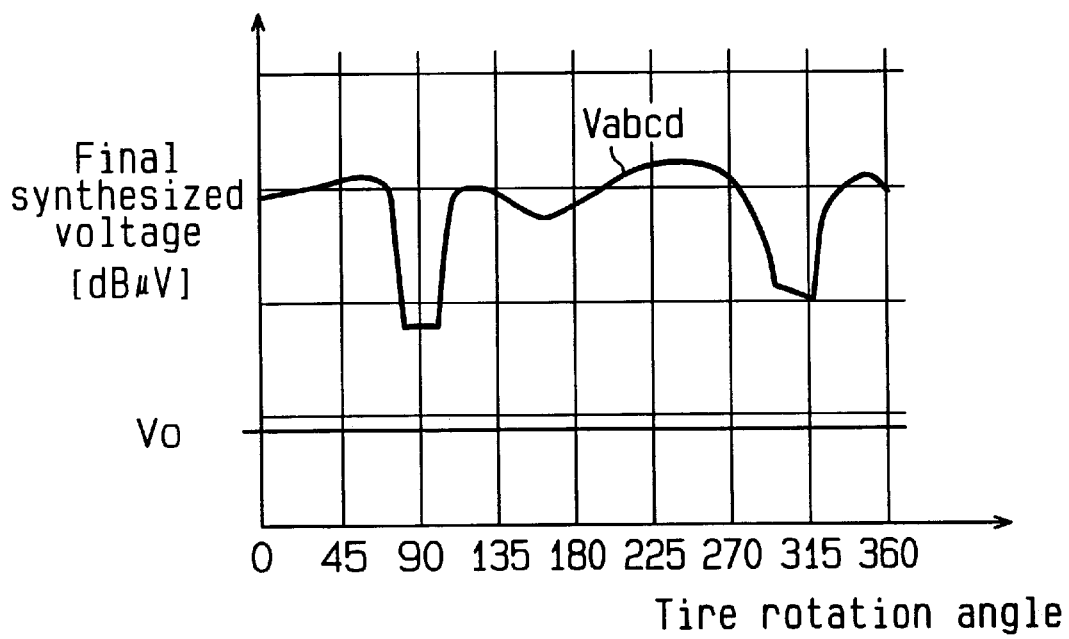
FIG. 6(c) is a graph exemplifying the synthesized voltage signal output from the third selection circuit of the synthesizer of FIG. 5.
Figure 7:
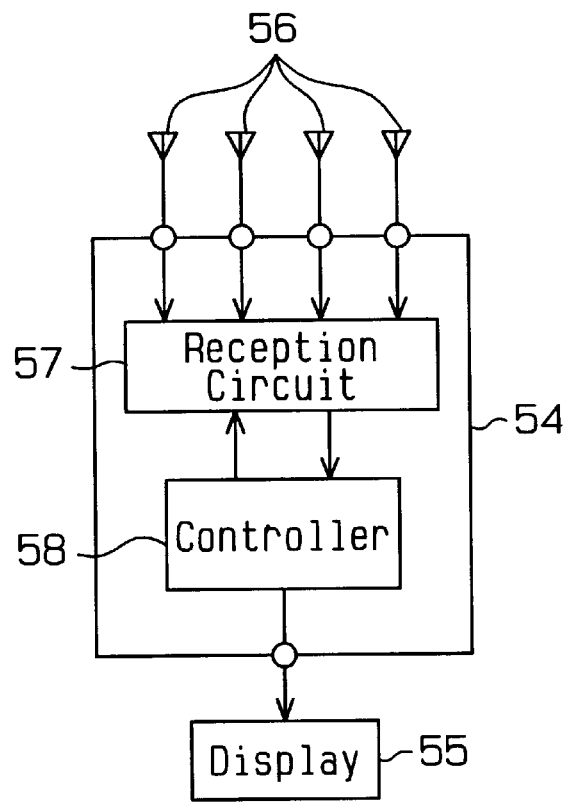
FIG. 7 is a block circuit diagram showing a prior art receiver.
Figure 8:
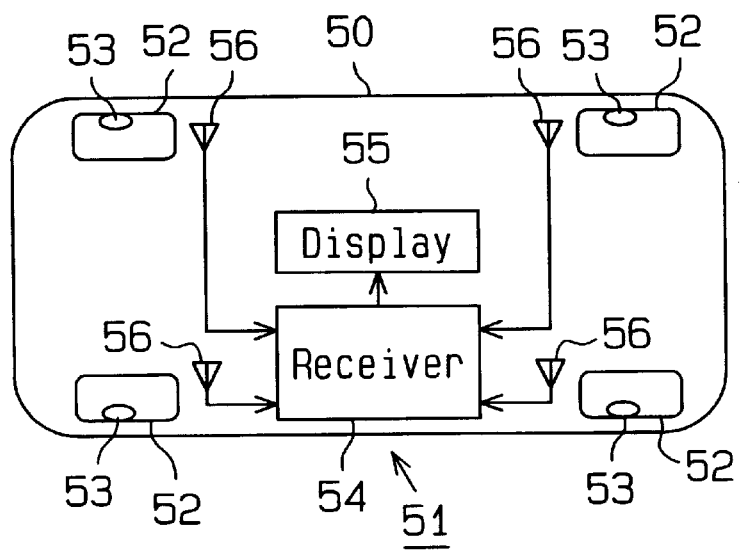
FIG. 8 is a schematic block diagram showing a tire inflation pressure monitor in the prior art.

The third selection circuit 41c selects the higher of the synthesized voltage signals Vab, Vcd that are simultaneously applied and applies the selected voltage to the reception circuit 33 as a final synthesized voltage signal Vabcd. FIG. 6(c) is a graph exemplifying the final synthesized voltage signal Vabcd corresponding to FIG. 6(b).

Suppose that the transmitter 15a transmits radio waves when the rotation angle of the tire 13a is about eighty to one hundred degrees or two hundred ninety to three hundred degrees. The induced voltage Va at the first reception antenna 31a at this time is lower than the threshold Vo as shown in FIG. 6(a). However, as shown in FIGS. 6(a)–6(c), the induced voltage Vb of the second reception antenna 31b, that is, the highest induced voltage Vd of the four induced voltages Va–Vd, is output to the reception circuit 33 as a final synthesized voltage signal Vabcd. The induced voltage Vb is higher than the threshold Vo when the rotation angle of the tire 13a is about eighty to one hundred degrees or two hundred ninety to three hundred degrees. This enables the reception circuit 33 to detect a voltage signal from the synthesizer 32 without fail.

As illustrated, the final synthesized voltage signal Vabcd input in the reception circuit 33 is higher than the threshold Vo regardless of the rotation angle of the tire 13a. Therefore, the reception circuit 33 is able to detect a voltage signal based on radio waves from the transmitter 15a through the synthesizer 32 regardless of the rotation angle of the tire 13a.

Likewise, when radio waves are transmitted from one of the other transmitters 15b–15d of the tires 13b–13d, the highest of the voltage signals that are respectively induced at the four reception antennas 31a–31d is applied to the reception circuit 33 through the synthesizer 32. The voltage signal applied to the reception circuit 33, that is, the final synthesized voltage signal Vabcd, is higher than the threshold Vo regardless of the rotation angle of the tires 13b–13d in the manner of the final synthesized voltage signal Vabcd exemplified in FIG. 6(c). Therefore, the reception circuit 33 detects a voltage signal from each of the transmitters 15b–15d through the synthesizer without fail.

As a result, the reception by the receiver 17 of signals from all the transmitters 15a–15d is stable. Also, there is no need to increase the number of reception antennas to improve the performance of the receiver 17, which simplifies the structure of the monitor and reduces costs.

The synthesizer 32 includes the three selection circuits 41a–41c to select a highest signal of the four input signals through several steps. Each selection circuit 41a41c receives two signals and outputs one signal. Each selection circuit 41a–41c simply selects the higher signal of the two input signals. This manner of selecting the highest signal is preferred over selecting one signal of four input signals in one step.

Each selection circuit 41a–41c includes two π-type filter circuits 42a–42f. Each π-type filter circuit 42a–42f includes only three impedance elements, which include one coil 43 and two capacitors 44. Accordingly, each selection circuit 41a–41c is simple. This reduces the manufacturing costs and the size of the synthesizer.

The illustrated embodiment may further be varied as follows.

Other types of synthesizers may be employed as long as it receives a plurality of signals and outputs one signal.

The synthesizer 32 of FIG. 5 selects a highest signal from a plurality of input signals. The synthesizer 32 may be replaced by a type of circuit that generates a synthesized signal that is the same as the highest among the input signals, by adding the voltages of the simultaneously input signals.

The filter circuits 42a–42f may be other types of circuits, such as, L-type, K-type, or T-type circuits.

When each reception antenna 31a–31d induces a voltage based on the radio waves from the transmitter 15a of the right front tire 13a, the first and second selection circuits 41a, 41b output the synthesized voltage signals Vab, Vcd, which are each higher than the threshold Vo as shown in FIG. 6(b). Accordingly, it is presumed that when each reception antenna 31a–31d induces a voltage based on the radio waves from the transmitter 15b of the left front tire 13b, the first and second selection circuits 41a, 41b produce synthesized voltage signals Vab, Vcd that are substantially at the same level as the synthesized voltage signals Vab, Vcd shown in FIG. 6(b).

Also, it is presumed that when each reception antenna 31a–31d induces a voltage based on the radio waves from the transmitter 15c or 15d of the left rear tire 13c or right rear tire 13d, the first selection circuit 41a produces the synthesized voltage signal Vab, which is substantially at the same level as the synthesized voltage signals Vcd shown in FIG. 6(b), and the second selection circuit 41b outputs the synthesized voltage signal Vcd, which is substantially at the same level as the synthesized voltage signal Vab shown in FIG. 6(b).

Therefore, it is presumed that if any one of the transmitters 15a–15d transmits radio waves, the synthesized voltage signals Vab, Vcd that are respectively output from the first and second selection circuits 41a, 41b are always higher than the threshold Vo. Therefore, the third and fourth reception antennas 31c, 31d or the first and second reception antennas 31a, 31b may be omitted. Reducing the number of reception antennas simplifies the synthesizer 32 and reduces the number of the selection circuits. Further, the wiring for the reception antennas is simplified.

If, for example, two of the reception antennas are omitted, the remaining reception antennas are arranged near the center of the vehicle between the front tires 131, 13b and the rear tires 13c, 13d. In this way, if any of the transmitters 15a–15d transmits radio waves, the level of the voltage signal that is finally input to the reception circuit 33 does not greatly fluctuate.

Accordingly, the number of reception antennas does not have to correspond to the number of transmitters. The number and location of the reception antennas are determined in accordance with various conditions, which include vehicle size and the communication environment.

An alarm device that warns of the abnormality of tire inflation pressure by sound may be provided.

The tire inflation pressure monitor of the present invention may be applied to other vehicles such as trucks having more than four wheels and motor bikes having two wheels.

The present examples and embodiments are to be considered as illustrative and not restrictive and the invention is not to be limited to the details given herein, but may be modified within the scope and equivalence of the appended claims.

What is claimed is:

1. A tire inflation pressure monitor having a plurality of transmitters respectively located in a plurality of vehicle tires for transmitting data concerning the inflation pressure of the tires by radio waves and a receiver for receiving the data from the transmitters, the receiver comprising:

a plurality of reception antennas that each induce a voltage signal based on reception of the radio waves from an associated one of the transmitters, wherein the level of each of the induced voltage signals is different from the levels of the other voltage signals and varies in accordance with the rotational angle of the tire that corresponds to the associated transmitter;

a synthesizer for synthesizing the induced voltage signals into a synthesized voltage signal; and a processing device for processing the synthesized voltage signal to obtain the data.

2. The monitor according to claim 1, wherein the synthesizer selects and outputs the highest level voltage signal from the induced voltage signals.

3. The monitor according to claim 1, wherein the synthesizer selects and outputs the highest level voltage signal from the induced voltage signals in steps.

4. The monitor according to claim 3, wherein the synthesizer includes a plurality of selection circuits, each selection circuit receives a plurality of signals and outputs one signal.

5. The monitor according to claim 4, wherein each selection circuit selects and outputs the higher of two input signals.

6. The receiver according to claim 4, wherein each selection circuit includes a plurality of filter circuits.

* * * * *